United States Patent [19]

Carey

[11] 4,092,720
[45] May 30, 1978

[54] MULTI-TOOL MACHINE PROVIDED WITH A NUMERICAL CONTROL SYSTEM

[75] Inventor: Robert Carey, Eindhoven, Netherlands

[73] Assignee: U.S. Philips Corporation, New York, N.Y.

[21] Appl. No.: 729,900

[22] Filed: Oct. 6, 1976

[30] Foreign Application Priority Data

Jun. 10, 1975 Netherlands ..................... 7511705

[51] Int. Cl.² .............................................. G06F 11/00
[52] U.S. Cl. ....................................... 364/474; 82/2 B
[58] Field of Search ...................... 82/2 B; 235/151.11

[56] References Cited

U.S. PATENT DOCUMENTS

| | | | |
|---|---|---|---|
| 3,125,796 | 3/1964 | Brainard | 29/26 |
| 3,439,346 | 4/1969 | McGee | 340/172.5 |
| 3,559,257 | 2/1971 | Lemelson | 29/33 P |

*Primary Examiner*—Eugene G. Botz
*Attorney, Agent, or Firm*—Frank R. Trifari; Steven R. Biren; Daniel R. McGylnn

[57] ABSTRACT

A method of and device for machining workpieces on a multi-tool machine provided with a numerical control system. For the automatic, simultaneous execution of machining instructions which relate to the control of more than one tool, instruction groups are formed from machining instructions which can be simultaneously executed on the basis of their mutual independence. Within an instruction group, partial dependency can exist, on the basis whereof a subsequent instruction is executed, after a condition imposed in a previous instruction has been satisfied.

5 Claims, 9 Drawing Figures

OPDR 1

| | | | | | | | | | |
|---|---|---|---|---|---|---|---|---|---|
| N1 | G00 | X180000 | Z 0 | | | | | T01 | M06 |
| N2 | G01 | X174000 | | | | F500 | S04 | | M03 |
| N3 | | | Z 75000 | | | | | | |
| N4 | G00 | | Z 0 | | | | | | |
| N5 | G01 | X168000 | | | | | | | |
| N6 | | | Z 75000 | | | | | | |
| N7 | G00 | | Z 0 | | | | | | |
| N8 | G01 | X162500 | | | | | | | |
| N9 | | | Z 75000 | | | | | | |
| N10 | G00 | X162500 | Z 0 | | | | | T02 | M06 |
| N11 | G01 | X160000 | | | | F400 | | | |
| N12 | | | Z 40000 | | | | | | |
| N13 | | X162000 | | | | | | | |
| N14 | | | Z 75000 | | | | | | |
| N15 | G00 | X160000 | Z 0 | | | | | T03 | |
| N16 | G36 | X 8000 | Z 37000 | P2000 | D500 | F400 | | | |
| N17 | G00 | X160000 | Z 0 | | | | | T04 | M06 |
| N18 | G01 | X 95000 | | | | F300 | | | |
| N19 | G00 | X200000 | | | | | | | |

Fig. 5

OPDR 2

| | | | | | | |
|---|---|---|---|---|---|---|
| N51 | G00 | U 180000 | W 180000 | | T11 | M06 |
| N52 | G01 | U 174000 | | F 500 | | |
| N53 | | | W 75000 | | | |
| N54 | G00 | | W 180000 | | | |
| N55 | G01 | U 170500 | | | | |
| N56 | | | W 75000 | | | |
| N57 | G00 | | W 180000 | | | |
| N58 | G01 | U 164000 | | | | |
| N59 | | | W 110000 | | | |
| N60 | G00 | | W 180000 | | | |
| N61 | G01 | U 158000 | | | | |
| N62 | G00 | | W 110000 | | | |
| N63 | G00 | | W 180000 | | | |
| N64 | G01 | U 154500 | | | | |
| N65 | | | W 110000 | | | |
| N66 | G00 | | W 180000 | | | |
| N67 | G01 | U 148500 | | | | |
| N68 | | | W 150000 | | | |
| N69 | G00 | U 150000 | W 180000 | | T12 | M06 |
| N70 | G01 | U 148000 | | F400 | | |
| N71 | | | W 150000 | | | |
| N72 | | U 154000 | | | | |
| N73 | | | W 110000 | | | |
| N74 | | U 170000 | | | | |
| N75 | | | W 75000 | | | |
| N76 | G00 | U 165000 | W 40000 | | T13 | M06 |
| N77 | G01 | U 156000 | | F300 | | |
| N78 | G00 | U 180000 | | | | |
| N79 | | | W 150000 | | | |
| N80 | | U 160000 | | | | |
| N81 | G01 | U 142000 | | | | |
| N82 | G01 | U 200000 | | | | |

Fig.6

OPDR 3

| | | | | | | |
|---|---|---|---|---|---|---|
| N101 | G00 | P 0 | R180 000 | | T31 | M06 |
| N102 | G01 | | R- 5000 | F200 | | |
| N103 | G00 | P 26000 | R185 000 | | T32 | M06 |
| N104 | G01 | | R- 5000 | F500 | | |
| N105 | G00 | | R185 000 | | | |
| N106 | G01 | P 32000 | R- 5000 | | | |
| | | | | | | |
| N126 | G01 | P 93000 | R- 5000 | | | |
| N127 | G01 | | R185 000 | | | |
| N128 | G01 | P 99500 | R- 5000 | | | |
| N129 | G00 | | R185 000 | | | |
| N130 | G01 | P106000 | R130 000 | | | |
| N131 | G00 | | R185 000 | | | |
| N132 | G01 | P113000 | R130 000 | | | |
| N133 | G00 | | R185 000 | | | |
| N134 | G01 | P119500 | R130 000 | | | |
| N135 | G00 | P120000 | R180 000 | | T33 | M06 |
| N136 | G01 | | R130 000 | F400 | | |
| N137 | | P 100000 | | | | |
| N138 | | | R 5000 | | | |
| N139 | G00 | P 90000 | | | | |
| N140 | | | R 20000 | | | |

MULTI-TOOL MACHINE PROVIDED WITH A NUMERICAL CONTROL SYSTEM

The invention relates to a method of machining a workpiece by means of a multi-tool machine, provided with a numerical control system. Multi-tool machines lathes for example have been employed for the automatic bulk manufacture of workpieces since long before the introduction of numerical control systems. The short machining time per product is an important property of this type of machine. It would be attractive to utilize this property for the production of short series of workpieces in addition to long ones. However, this has been found to be uneconomical up till now because of the long setting-up times involved in preparing such a multi-tool machine for the automatic machining of a series.

Nowadays, short production series can be justified if numerical control is used. However, known numerical control system control the corresponding machine in response to a series of successive machining instructions, which instructions each relate to the control of one tool. It is not possible with these known systems to make a plurality of tools perform an operation simultaneously; all machining instructions are consecutively performed one after the other in the order of the series, which can result in a machining time which is still quite long.

The invention has for an object to mitigate this drawback. According to one aspect the invention provides a method of machining a workpiece by means of a multi-tool machine with a numerical control system for individually controlling different tools of said machine, in which method the control system is supplied with machining instructions which involve control of individual said tools, at least one set of instructions which relate to the control of different tools and which can be executed simultaneously are formed into a group, and instructions within that group are automatically executed simultaneously. With such a method it may be possible to form certain sub-series of machining instructions relating to the control of each tool (or tool-holder) as if the numerical control were applied only to the relevant tool or tool-holder, which sub-series can be executed simultaneously with other such sub-series provided that they are mutually independent. Use of such a method can reduce the machining time otherwise required. Moreover it may be possible for each sub-series that it can be worked through without having to take other data (relating to the progress of other tools) into account.

According to another aspect the invention provides a multi-tool machine provided with a numerical control system for individually controlling different tools of said machine, which system includes means for causing instructions fed thereto which relate to the control of different ones of the machine tools to be automatically executed simultaneously provided that said instructions are formed into a group. Still according to a further aspect of the invention the said control system includes means for causing a condition present in a given instruction within said group to prevent a particular instruction within said group from being executed until said condition is satisfied, if such a condition should be present within said given instruction.

An embodiment of the invention will now be described in detail, by way of example, with reference to the accompanying diagrammatic drawings in which.

Figure 1:
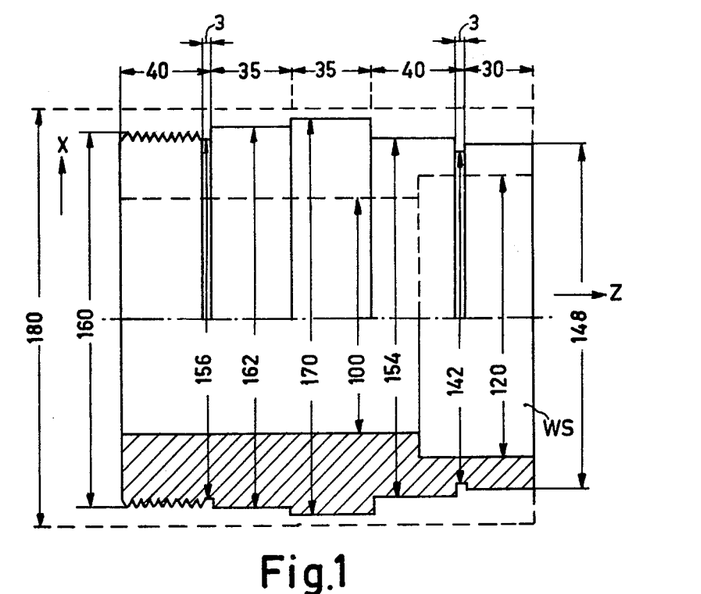
FIG. 1 shows a workpiece.

The workpiece WS shown in FIG. 1 is to be manufactured from solid material in the shortest possible period of time. The machining operations required (coarse turning, finishing, thread-cutting, parting off, groove-cutting and drilling) are executed by means of a lathe provided with a plurality of turret slides, which lathe is shown diagrammatically in FIG. 2. The lathe DB of FIG. 2 comprises three independently movable turret slides 1, 2 and 3. The upper slide 1 is driven by separate motors in a pair of coordinate directions X and Z; the lower slide 2 is similarly driven in a pair of coordinate directions U and W; the rear slide 3 is similarly driven in a pair of coordinate directions P and R. A chuck holding the sliders is driven by a separate, heavy spindle motor. Measuring systems (not shown in FIG. 2) signal the actual displacements of the slide to a numerical control system which controls the machine.

The numerical control system includes a plurality of numerical control devices, one of each slide.

Figure 3:
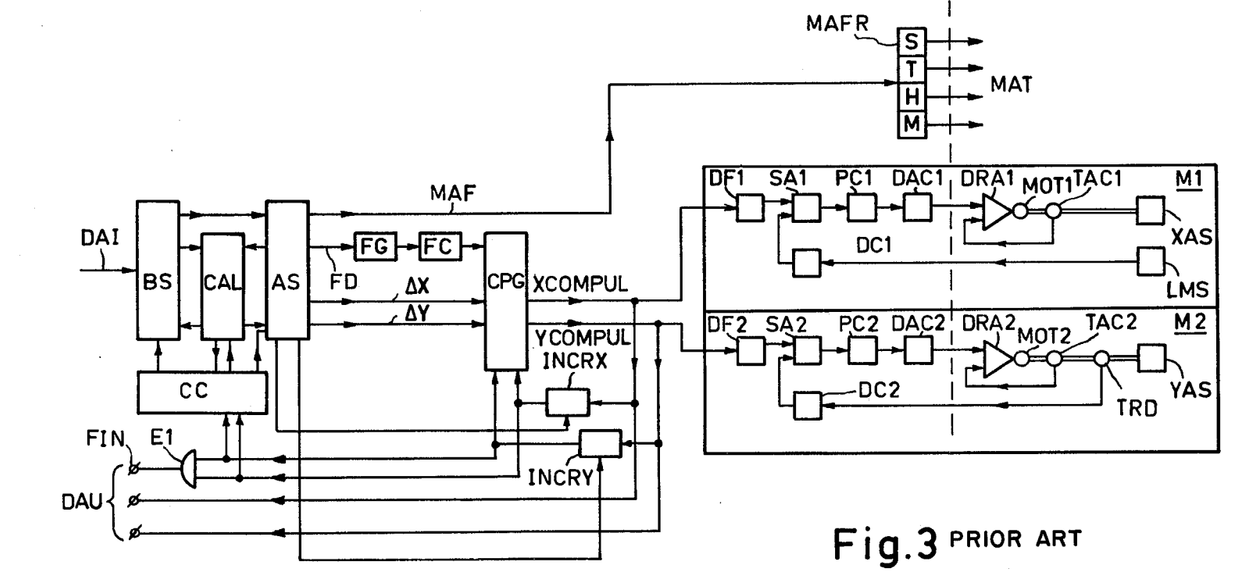
FIG. 3 is a block diagram of a numerical control device which forms part of a numerical control system for the machine shown in FIG. 2.

FIG. 3 is a block diagram of one such numerical control device. Depending on the complexity of the workpieces made on the machine, point, line and/or contour control will be required. In the example described here (FIG. 1), line control is sufficient to enable the machine to perform the required operations and the numerical control device of FIG. 3 is accordingly constructed for line control. If desired, the three control devices may have at least some sections, such as the arithmetic section (which comprises a calculator CAL and an interpolator included in a displacement command clock pulse generator CPE), in common, these sections being used on a time-sharing basis. If such time-sharing is employed the relevant stores (buffer store and processor store) included in the group of control devices must have sufficient capacity for the relevant information.

The operation of the control device shown in FIG. 3 will now be briefly described. It should be noted that this device is known per se and can be replaced by other forms of control device if desired.

Reference DAI denotes a data input bus via which control data, to be described hereinafter, are applied to a buffer store BS. A central clock device CC ensures that the data are processed in a given time sequence, which is co-determined by machine conditions (status). To this end, CC addresses the buffer store BS and a data are prepared in the calculator CAL for processing in the remainder of the control device (for example, by incremental data to absolute data conversion). Prepared data are stored in a so-called active store AS whence some are used to control the tools MAT on the corresponding turret slide to determine the actual machine functions: turning, cutting, boring and the like, via a line MAF and a machine function register MAFR. Feed rate data from store AS are applied via line FD to a feed rate generator FG which generates a feed pulse pattern.

These pulses feed a feed control device FC which applies a feed rate signal to the displacement command pulse generator CPG. On the basis of displacement instructions for the corresponding pair of coordinate directions X and Y (ΔX and ΔY from store AS) and the said feed rate signal generator CPG generates command pulses XCOMPUL and YCOMPUL for the relevant machine slide. These command pulses are applied to coordinate modules M1 and M2 respectively, and also to increment registers INCRX and INCRY, respectively. When an instruction is to be executed the number of increments in the paths to be completed in the X-direction and the Y-direction are first input to these increment registers and the increments executed are subsequently counted down therein from these values as the instruction is executed. When the increment registers have counted down to zero, "in position" signals are applied to the generator CPG which then stops, the relevant instruction having been completed. In the co-ordinate modules M1 and M2 the command pulses XCOMPUL and YCOMPUL are applied, via digital filters DF1 and DF2, respectively, to up/down counting devices SA1 and SA2, respectively, the contents of which are applied to buffering counters PC1 and PC2, respectively. The contents of PC1 and PC2 are a direct measure of how the slide motors are to be controlled and are converted in digital-to-analog converters DAC1 and DAC2, respectively, into signals suitable for actually controlling these motors MOT1 and MOT2. The control signals are applied to the motors MOT1 and MOT2 via amplifiers DRA1 and DRA2, respectively. In this example, control is effected by means of generators TAC1 and TAC2, output of which are fed back to the amplifiers DRA1 and DRA2, respectively. Measuring systems LMS (linear measuring system for displacement) and TRD (rotation measuring system for displacement) signal the progress of the slide to the up/down counting devices SA1 and SA2 via digital converters DC1 and DC2 for the X- and Y-ccordinates respectively. These devices always count up in response to the command pulses XCOMPUL and YCOMPUL originating from the generator CPG and count down in response to the pulses originating from the measuring systems. The contents of these counting devices at any instant therefore indicate the value of the control signal by which the motors must be controlled. The drive for the X-coordinate displacement means (XAS) for the relevant turret slide and the Y-coordinate displacement means (YAS) for the relevant slide is thus complete. When the signals "in position" are applied by the increment counters INCRX and INCRY to the generator CPG, in which interpolation takes place by means of a pulse generating, interpolator, the supply of command pulses to the devices SA1 and SA2 ceases. The control of the motors ceases, however, only when the contents of PC1 and PC2 have become zero (there is a delay due to the time constant of the digital filter and the inertia of the machine).

The device also has output terminals DAU for the command pulses XCOMPUL and YCOMPUL and for a signal FIN which originates from an AND-function gate E1 and which indicates when an instruction has been executed (both X and Y are "in position").

Figure 4:
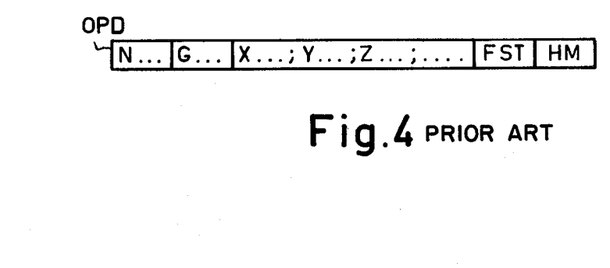
FIG. 4 shows a format for a machining instruction.

Standard work piece programmes consist of a succession of machining instructions which are composed of standardized (ISO) codes and instructions. The standard format of such a machining instruction OPD is shown in FIG. 4. N denotes the number of the instruction, G codes serve to indicate the type of instruction, X..., Y..., Z..., etc. denote the dimensional information, FST is a code for the technological data such as feed rate, rate of revolution, tool number, and HM denotes codes for additional data such as cam positions etc. and directions of rotation, start/stop of spindles etc. With known numerical control systems the order in which the instructions are carried out is determined by the order in which the successive instructions are listed, for example, as punched in a punched tape. Each instruction is numbered one higher than the previous one.

Figure 2:
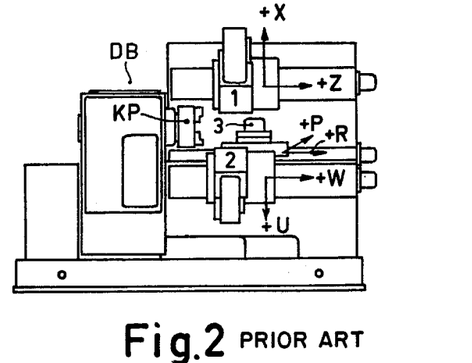
FIG. 2 shows a multi-tool machine for machining the workpiece shown in FIG. 1.

Thus with known numerical control systems the machine comprising three slides shown in FIG. 2 would be controlled by three numerical control devices one for each slide (or by one such device time shared between the three) in such manner that only one instruction is executed at a time, which does not necessarily lead to optimum results. The three slides of the horizontal lathe DB of FIG. 2 may each carry a turret tool holder containing, for example, six tools. If a simple separate instruction series were provided, i.e. one for each pair of coordinate directions, then even though complete freedom of operation would be obtained for each tool holder, the situation would be far from ideal, because the movements of the slides would not be synchronized. Accordingly, in addition to forming a separate series of instructions for each slide, instructions which relate to different slides but which can be performed simultaneously are formed into groups. (This can be done for any multi-tool machine in which operations are carried out with respect to a plurality of systems of coordinates).

Thus a separate series of machining instructions composed in the standard manner described above (with reference to FIG. 4) is first drafted for each slide. These series may be as follows:

N001
N002
.
.
N068
} SOPD1 machining instruction series 1 for slide 1 (X, Z).

N069
N070
.
.
N124
} SOPD2 machining instruction series 2 for slide 2 (U, W).

N125
N126
.
.
N250
} SOPD3 machining instruction series 3 for slide 3 (P, R).

Thus all data as regards movement, feed rates, rate of revolution, tool numbers, corrections etc, are included in accordance with the ISO standards. Groups of machining instructions which can be performed simultaneously (for different slides) are then formed, these groups being unlimited as regards length (= number of machining instructions therein). Some examples of such groups will now be given. The end of a group can be indicated in practice by starting a new line thereafter. (Normally, when machining instructions are stated one below the other, the next instruction is to be executed when the previous instruction has been completed). Thus:

Group: N001 N070 N127 means: start simultaneously with the execution of the instructions 1, 70 and 127.

Group: N005 (N074/N128) means: simultaneously execute the instructions N005 and N074 and start the instruction N128 as soon as the instruction N074 has been executed.

Thus, a condition is included in the latter group; a partial dependency exists. However, this still allows simultaneous execution of instructions: in this case N005 and N074, and N005 and N128 after N074 has been executed.

Group: N007 X25000/N126 means: start the instruction N007 and, when the X-ccordinate passes the position 25000, start the instruction N126. Again a partial dependency exists, however, not on an instruction in its entirety, but only on a part thereof.

Group: N139W24000E3/N128 means: start the instruction N139 and, when the W-coordinate passes the position 24,000 and the relevant machining operation in accordance with N139 has been repeated three times ("pattern repeat"), start instruction N128.

It will be clear from these examples that the ways in which groups of machining instructions can be drafted are very diverse. Moreover, the instructions of an instruction series need not be written in a given sequence for each system of coordinates (see above). This is because any instruction number can be inserted as long as the corresponding instructions are in accordance with those actually to be executed. This facilitates the drafting of the instruction series for each system of coordinates: it no longer need be in a specific order, as long as all instructions to be executed are stated on one list. The relationship between the various instructions is laid down in the groups. A series of groups then constitutes the complete machining cycle for a workpiece.

The complexity of an instruction group will increase as more independent or partially dependent machining instructions are simultaneously presented to the machine for execution. The following is an example of a more complex group:

N003  Y204/N127  Y15000/N128  Y25000/N129 (N085Z1234/N005).

The execution of this group starts with the instruction N003; when the Y-coordinate has reached the position 204, the instruction N127 starts; when the Y-coordinate has reached the position 15,000, the instruction N128 commences; when the Y-coordinate reaches the position 25000 the instruction N129 as well as the instruction N085 commences. When the Z-coordinate reaches the position 1234, the instruction N005 also commences. The next group is started when the entire previous group has been completed. Obviously, it is also possible in a practical situation for a group to be preceded or followed by one or more single instructions which are not to be executed simultaneously.

Figure 5:
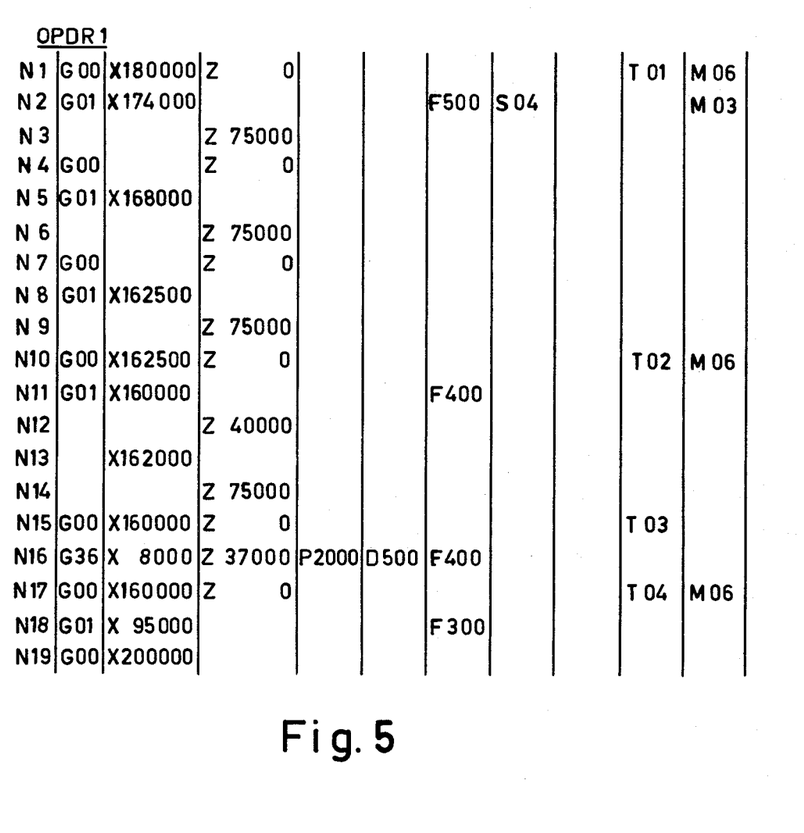
FIG. 5, FIG. 6 and FIG. 7 show series of machining instructions.

A detailed description will now be given of the machining of a workpiece WS as shown in FIG. 1. FIG. 5 shows an instruction series for the slide 1 of FIG. 2. This is the instruction series SOPD1 referred to above. The part GOO of the instruction N1 indicates that a starting point (at $X = 180000$, $Z = 0$) must be reached. A tool T01 (cutter) must then be in the operative position in the tool holder. M06 indicates a conditioned tool exchange i.e. a predetermined tool change operation. The part G01 of the instruction N2 indicates that a machining operation is to take place, in this case coarse turning, with the final value of $X = 174000$ (which means that $180,000 - 174,000 = 6000$ units have to be removed on a diameter basis, i.e. 3000 units of material) at a feed rate $F = 500$ and a spindle speed of S04. M03 indicates clockwise rotation of the spindle. Coarse turning is followed by an instruction N3 which the same as N2 (as long as an instruction code remains unchanged, the old code is maintained) but in addition $Z = 75000$ is to be reached in the Z-direction. N4 indicates a new start for a subsequent turning operation: operation N5; the diameter change is sgain 6000 units. The next diameter change is 5500 units. Retaining the position then reached in the X-direction ($X = 162500$), $Z = 0$ is then returned to (N10) and a tool change occurs: T02 (fine cutter) by means of which a finishing operation is performed during the execution of instruction N11. The feed rate for this is lower, $F = 400$; the diameter change is 2500 and extends as far as $Z = 40000$ (N12). Instruction N13 starts the finishing of the second shoulder (from the left) of the workpiece by means of the fine cutter: $X = 162000$ and $Z = 75000$ in N14. Subsequently (N15), a new starting point $X = 160,000$ and $Z = 0$ is reached, and a tool change occurs: cutter T03 for thread cutting. N16 is the thread cutting instruction: G36; $X = 8000$ is double the thread depth (X is on diamater basis), $Z = 37000$ indicates the thread length in the axial direction and P2000 is a code for the cutting depth per thread cutting cycle. The code $D = 500$ indicates the cutter arrangement after each thread cutting cycle, i.e. 500 in the direction along the oblique, previously cut thread. Thread cutting is effected in $X/P = 8000/2000 = 4$ cycles in this case. N17 indicates a new tool change for the parting off operation on the left-hand end of the workpiece (instruction N18). Parting off is effected only down to $X = 95000$, because the remainder of the material is to be removed subsequently by drilling and turning. N19 indicates a retraction in the X-direction to $X = 200,000$.

Figure 6:
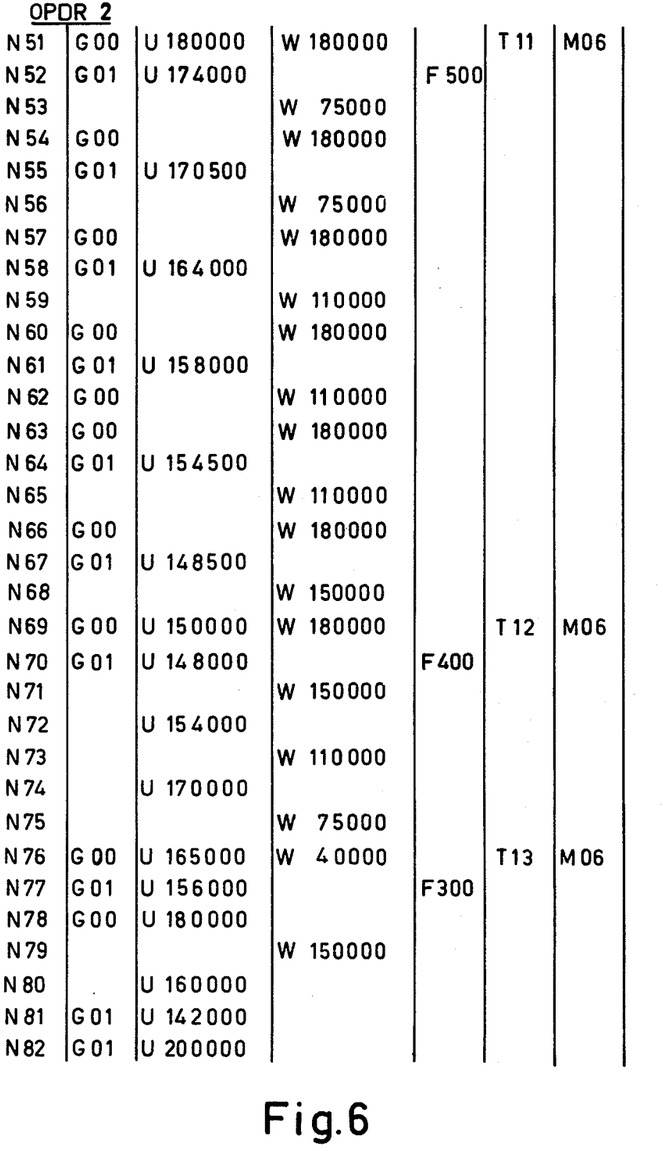

FIG. 6 shows the instruction series SOPD2 for the slide 2 of FIG. 2 for the workpiece WS of FIG. 1. This figure is self-explanatory. N51–N68 represent coarse turning at the right of the workpiece, N69–N75 the finishing operation thereat, whilst N76–N82 represent the cutting of the two grooves.

Figure 7:
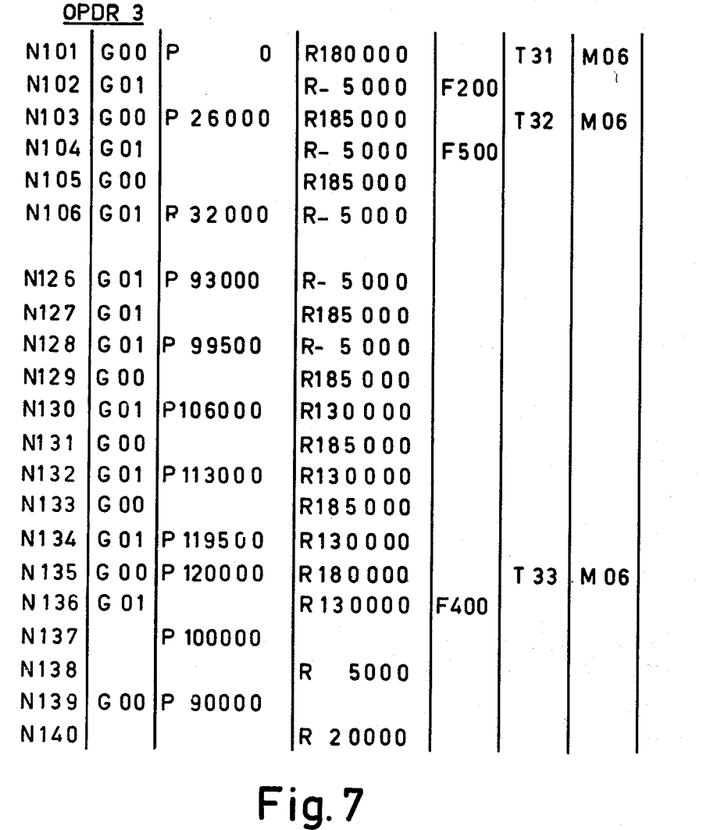

Similarly FIG. 7 shows the instruction series SOPD3 for the slide 3 of FIG. 2 and represents the hollowing out of the workpiece.

Figure 8:
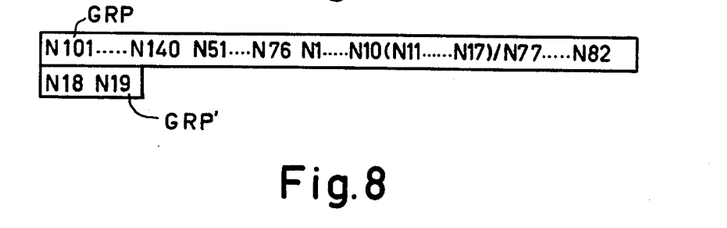
FIG. 8 shows a group of instruction numbers.

As mentioned above, groups of those of the aforesaid machining instructions which can be executed simultaneously are drafted. For example it may be possible that all slides start simultaneously; the user must judge whether or not this is possible in view of the spindle power. The slide 3 can complete its entire instruction series (N101–N140) without interruption. The slide 2 can complete the turning operations (N51–N76) without interruption but must postpone the groove cutting operations (N77–N82) until the slide 1 has commenced its finishing operations (instruction N11). The slide 1 can carry out its turning operations and cut the thread (instructions N1–N17) without interruption, but must postpone the parting off operation (N18–N19) until the slide 2 and the slide 3 have completed their operations. A group GRP of instructions drafted for this purpose is shown in FIG. 8. It should be noted that never more than one instruction is executed by each slide at one time: only one of the tools of the relevant tool holder can be in use at any given time. Consequently, the writing of instructions N101 . . . . N140 in succession implies that these instructions are executed consecutively. However, the instructions N51 ... N76 can be executed simultaneously with N1 ... N17, provided that execution of N77 waits for a start to be made on the execution of N11 ... The next group GRP' in this example will consist only of the Instructions N18 and N19.

Figure 9:
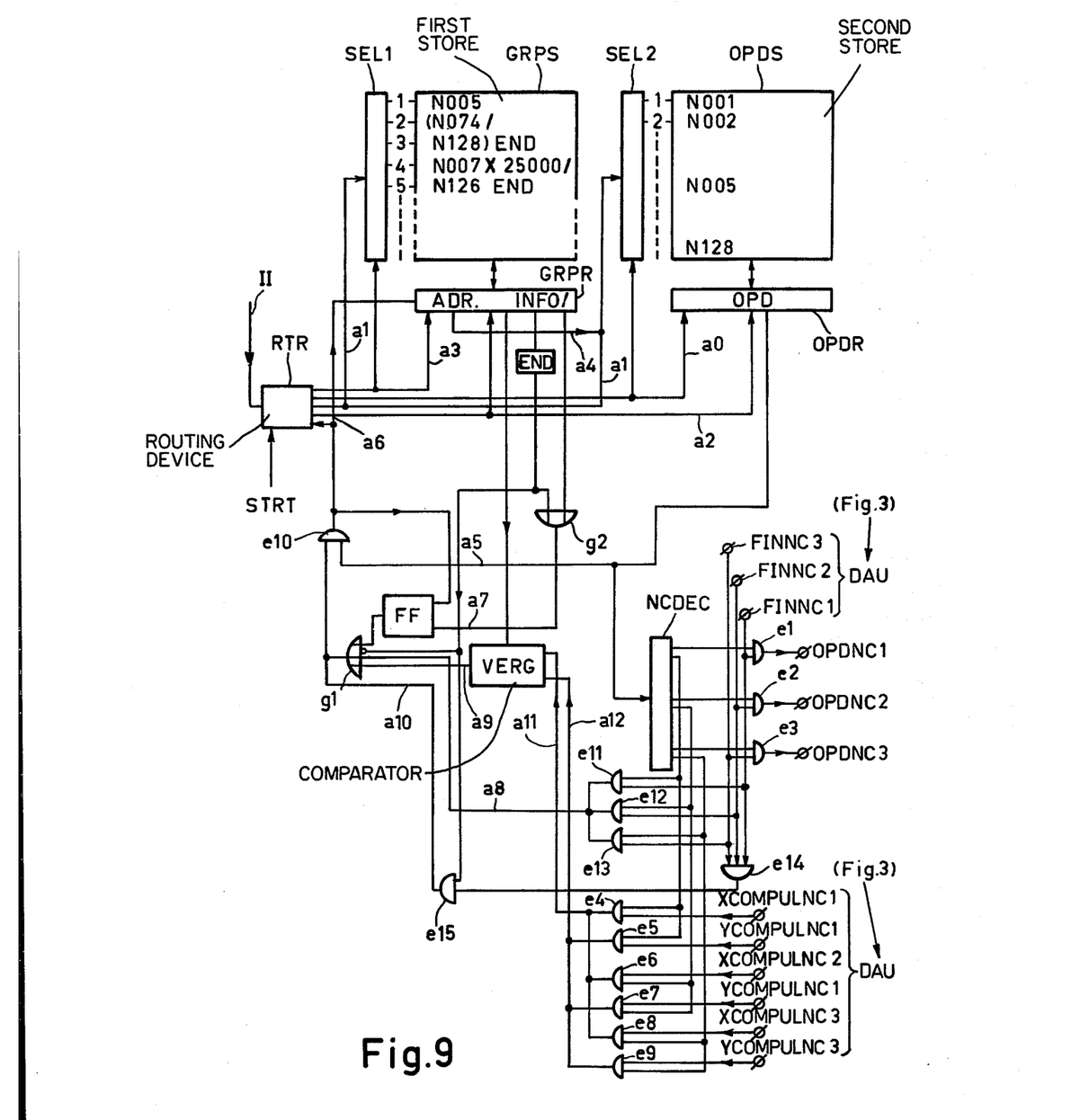
FIG. 9 shows another part of the numerical control system which includes the device of FIG. 3.

FIG. 9 shows another part of the overall numerical control system, (which system contains three devices as shown in FIG. 3), which part enables the groups of instructions to be utilized correctly. Although FIG. 9 is a simple circuit diagram (for ease of explanation) the system portion shown therein may in fact be constituted by a suitably programmed microprocessor.

The system portion shown in FIG. 9 comprises a group store GRPS provided with a selection device SEL1 and an input/output buffer register GRPR. An instruction store OPDS, provided with a selection device SEL2 and an input/output register OPDR, is also provided. The input of the system portion is formed by a routing device RTR, having a starting input STRT and an information input II. Information originating from an external storage medium, for example paper tape or magnetic tape, is supplied to the stores GRPS and OPDS by RTR. The instructions which may be involved in the execution of a machining operation on a workpiece are all successively numbered and stored in OPDS. These are the instruction series SOPD1, SOPD2..., containing the instructions N001, N002.... When instructions are being stored in the store OPDS, a signal is present on the line $a0$ which prepares the selection device SEL2 and the register OPDS. RTR includes a counter (not shown) the count in which is increased by one step each time an instruction, read from the external store, arrive in RTR. The contents of this counter at any time form an address in the store OPDS, which address is applied from RTR to SEL2 via the line $a1$ (actually a multiple line), thereby directing the information to the correct location in OPDS. The instruction information OPD is applied from RTR to the register OPDS via the line $a2$ (actually, a multiple line whence it is stored in the assigned position in OPDS. The same is effected for the group information GRP, a line $a3$ preparing the units SEL1 and GRPR for this purpose. The individual instruction numbers of a complete group are then stored in the store GRPS successively, selection of the addresses in store GRPS being effected via the line $a1$ (from the counter the RTR) to the selection device SEL1, the instruction numbers arriving in the store GRPS via the line $a2$ and the register GRPR. In this example, the individual instruction numbers of a group and the associated condition information are stored in successive addresses of GRPS. This, a group N005 (N074/N128) may be arranged at three successive addresses, provided with an end indication END. A second group, N007 × 2500/N126, may be stored at the two subsequent successive addresses. A series of instruction groups and the instructions themselves is input in this way.

The stored information is now processed as follows, a number of operations being distinguishable therein: Operation 1: After a starting command, the counter in RTR is set to the first address in the store GRPS. The line $a3$ carries a signal and the first address in GRPS containing the number of the first instruction of the first group: N005 is selected via SEL1. Operation 2: this number N005 is applied to the register GRPR (left-hand section "ADR") and is transferred as address information to SEL2 via line $a4$. Operation 3: the contents of the instruction having the number 005 is selected at the address 005 in the store OPDS. This instruction information OPD is then applied to the register OPDS, from which it is applied to a decoder NCDEC via a line $a5$. NCDEC determines from the instruction OPD for which slide this instruction is intended. Although one numerical control device could be used on a time-sharing basis, in this example three separate numerical control devices NC1, NC2 and NC3 are provided for the three slides. When such a numerical control device (as shown in FIG. 3) has been prepared to accept a new instruction, a signal appears on the relevant input FINNC1, FINNC2 or FINNC3, preparing a corresponding AND-function gate $e1$, $e2$ or $e3$ so that it can pass on an instruction if one should be present for that device. If there should be such an instruction information appears on corresponding output OPDNC1, OPDNC2 or OPDNC3 whence it is applied to the input DAI of the corresponding numerical control device (FIG. 3). The despatch of an instruction to a numerical control device is signalled to an input of AND-function gate $e10$ via line $a5$. Operation 4: If the flipflop FF is in the rest state, a signal is present on its output (left-hand side); and this signal reaches the AND-function gate $e10$ via the AND/OR-gate $g1$, the inverting AND function input of which (denoted by a circle) is assumed to be "low". When gate $e10$ is enabled by the signal on $a5$ the register GRPR is set and the flipflop FF is reset if necessary (in this case it remains in the said rest state) via the line $a6$. Moreover, the counter in RTR is advances one step via the line $a6$. Operation 1 then takes place again; in this example "(N074/" is read. The symbol "(" signifies that the dependence, denoted by a "/", of the next instruction goes back only to the immediately preceding instruction. Operation 5: when the symbol "/" appears in the register GRPR, the line $a7$ carries a signal which indicates that progress is inhibited until after the previous instruction has been executed. The signal on $a7$ sets the flipflop FF via the OR-function gate $g2$ with the result that no signal is applied therefrom to the gate $g1$, temporally blocking the corresponding operation 4. Operation 6: determination of when the imposed dependency condition has been satisfied, in this case when N074 has been completed. It is known in the decoder NCDEC which numerical control device is concerned, and this fact is used to prepare one of the AND-function gates $e11$, $e12$ and $e13$. If a signal FINNCi arraives from the same numerical control device as the one assigned in NCDEC, a signal is applied to the gate $g1$ via the line $a8$. This signifies that the condition has been satisfied and the AND function gate $e10$, already prepared via the line $a5$, produces an output, allowing an operation 1 to commence again. In the present example the next instruction will be N128. The information in GRPS corresponding thereto includes an indication END, which means that the group GRP is terminated. Operation 7: enabling the next group to be started when and only when all instructions started in the previous group have been executed. The signal END is used to set the flipflop FF via the gate $g2$ and the line $a7$ (= operation 5, temporally blocking operation 4) and to block $g1$ via its inverting AND input. All signals FINNC from all numerical control devices must be present before the next group is commenced. This is determined by means of an AND-function gate $e14$. When this conditions has been satisfied, the line $a10$ carries a signal because an AND-function gate $e15$, prepared by the END code, opens. Line $a6$ then carries a signal so that antother operation 1 can commence. This signal also resets the flipflop FF. The next address (4) of the store GRPS is then produced by RTR, causing the instruction numbers N007 together with the condition X25000/ to appear in the register GRPR. Operations 2 and 3 are then executed but operation 4 is blocked, due to the presence of the condition X25000/. Operation 5: the symbol "/" sets FF and the gate $e10$ remains blocked. Operation 6: the condition information X25000 arrives in a comparison device VERG. This device is also supplied with the X-coordinate information from the relevant numerical control device (which device is determined by the decoding instruction N007 in NCDEC, via the relevant AND-function gate $e4$, $e6$ or $e8$; gates $e4$ and $e5$, $e6$ and $e7$, or $e8$ and $e9$ are enabled by an output from NCDEC, transmitting the signals XCOMPULNC and YCOMPULNC originating from the relevant numerical control device (FIG. 3: DAU) to the comparison device VERG via the lines $a11$ and $a12$, respectively. The X-value applied to VERG from GRPR is reduced by the relevant signal XCOMPULNC and, when it reaches zero, the line $a9$ carries a signal which is applied to the gate $e10$ via the gate $g1$. The inhibition of operation 4 is thus removed, and the next operation 1 is started causing N126 END to be supplied to GRPR.

What is claimed is:

1. A method of machining a workpiece by means of a multi-tool machine provided with a numerical control system for individually controlling different tools of the machine, comprising the steps of:

providing machining instructions for controlling individual ones of said tools, said instructions being divided into groups, the instructions in one group being further divided into sets, the instructions in a first set relating to the control of different tools being executable simultaneously;

simultaneously executing the instructions in said first set; and subsequently simultaneously executing a second set of instructions within said group after a condition imposed by a first instruction in said first set has been satisfied.

2. A multi-tool machine control system for individually controlling different tools of the machine, comprising:

means for supplying a group of sets of instructions for operating said machine, including at least a first set and a second set;

means for simultaneously executing instructions of each of said sets, each instruction relating to the control of different ones of said machine tools; and means for detecting a condition specified by a first instruction within said first set, and preventing execution of a second instruction within said second set of said one group until said condition is satisfied.

3. A system as claimed in claim 2 wherein said supplying means comprises a first store for storing the addresses of the instructions contained in each group, and a second store for storing the said instructions; and means for successively deriving the addresses of the instructions in each group from said first store and the instructions from the second store.

4. A system as claimed in claim 2 wherein said supplying means comprises a first store for storing addresses of the instructions and condition information imposed by said instructions stored therein; and means for deriving said condition information from said store together with the addresses of the corresponding instructions.

5. A system as claimed in claim 4, further comprising:

a comparator having a first input connected to said means for deriving said condition information; a second input; and an output;

means connected to said second input of said comparator for supplying information concerning the status of the variable on which said condition information imposed by said instructions corresponds; and means connected to said output of said comparator for blocking the accessing of further instructions from the second store.

* * * * *